United States Patent
Kim et al.

(10) Patent No.: US 8,072,679 B2
(45) Date of Patent: Dec. 6, 2011

(54) MICROSCOPE AND METHOD OF PROVIDING IMAGE DATA USING THE SAME

(75) Inventors: Dong-wan Kim, Seongnam-si (KR); Dong-gun Lee, Hwaseong-si (KR); Sung-min Huh, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 827 days.

(21) Appl. No.: 12/153,785

(22) Filed: May 23, 2008

(65) Prior Publication Data

US 2008/0297891 A1    Dec. 4, 2008

(30) Foreign Application Priority Data

May 23, 2007    (KR) .................. 10-2007-0050260

(51) Int. Cl.
   *G02B 21/16*    (2006.01)

(52) U.S. Cl. ........ 359/385; 359/368; 359/584; 359/586; 359/589

(58) Field of Classification Search .................. 359/364, 359/368, 385, 584, 586, 589
See application file for complete search history.

(56) References Cited

U.S. PATENT DOCUMENTS

| | | | |
|---|---|---|---|
| 6,108,127 A | 8/2000 | Atkinson | |
| 6,925,225 B2 | 8/2005 | Engel et al. | |
| 2005/0110972 A1* | 5/2005 | Tsuji et al. | 355/67 |
| 2006/0186361 A1* | 8/2006 | Weiss et al. | 250/559.45 |
| 2007/0188721 A1* | 8/2007 | Hasegawa | 355/30 |

FOREIGN PATENT DOCUMENTS

| | | |
|---|---|---|
| JP | 2000-131618 | 5/2000 |
| JP | 2003-084202 | 3/2003 |
| JP | 2004-530947 T | 10/2004 |
| KR | 10-2001-0012563 A | 2/2001 |
| WO | WO 03/003098 | 1/2003 |

* cited by examiner

*Primary Examiner* — Joshua L Pritchett
(74) *Attorney, Agent, or Firm* — Lee & Morse, P.C.

(57) ABSTRACT

A microscope includes optics configured to direct beams onto an object including a reflective material, a detector configured to receive a field spectrum formed by beams reflected by the object, and a calculator configured to reconstruct an image of the object from the field spectrum detected by the detector.

18 Claims, 3 Drawing Sheets

MICROSCOPE AND METHOD OF PROVIDING IMAGE DATA USING THE SAME

BACKGROUND OF THE INVENTION

1. Field of the Invention

Embodiments relate to a microscope and a method of providing image data using the microscope. More particularly, embodiments relate to a microscope providing high resolution image data of a reflective material mask and a method of providing the image data using the microscope.

2. Description of the Related Art

Transmissive scattering microscopes may be used with beams, e.g., X-ray beams, which may be transmitted through an object. Beams scattered by the object are detected by a detector. When the beam is wider than the object, a central blockage may be provided to prevent beams that do not interact with the object from being incident on the detector. However, 0th order or low order light among the scattered beams may also be blocked by the central blockage. The 0th order or low order light provides information regarding an outline of the object. This information may be supplied using a longer wavelength, lower resolution microscope, e.g., a visible microscope, or may be supplied in advance. While transmissive microscopes may be applied to objects through which the beams may pass, they cannot be applied to a reflective material, e.g., an extreme ultraviolet (EUV) mask.

A microscope for use with an EUV mask may provide an incoherent EUV beam passing through illumination optics onto the EUV mask. The beam scattered from the EUV mask forms a field spectrum, and a detector images the scattered beam through imaging or projection optics, which convert the field spectrum into an image. However, use of imaging optics may give rise to aberration errors, misalignment, and defocus in the image data.

SUMMARY OF THE INVENTION

Embodiments are therefore directed to a microscope and a method of providing image data using the microscope, which overcome one or more of the disadvantages of the related art.

It is a feature of an embodiment to provide a microscope and a method of providing image data using the microscope without aberration error.

It is another feature of an embodiment to provide a microscope and a method of providing image data using the microscope without misalignment issues.

It is yet another feature of an embodiment to provide a microscope and a method of providing image data using the microscope without defocusing problems.

At least one of the above and other features and advantages may be realized by providing a microscope including optics configured to direct beams onto an object including a reflective material, a detector configured to receive a field spectrum formed by beams reflected by the object, and a calculator configured to reconstruct an image of the object from the field spectrum detected by the detector.

The beams may be extreme ultra violet (EUV) beams, e.g., having a wavelength of about 13.5 nm.

The object may be a reflective mask, e.g., an EUV mask.

The optics may include a spherical mirror and a plane mirror. The optics may be configured so that the beams are sequentially reflected by the spherical mirror and then the plane mirror. The plane mirror may be formed so that the beams reflected by the spherical mirror are incident on the object at an angle of about 6° from a line perpendicular to the object. The spherical mirror and the plane mirror may respectively include a multi-layered structure. The multi-layered structure may include a repeated stack of a molybdenum layer and a silicon layer.

The microscope may further include a shutter disposed so that the beams are incident on the shutter before the optics, the shutter being configured to adjust an intensity of the beams.

The microscope may include a pinhole disposed so that the beams are incident on the pinhole before the optics, the pinhole being configured to select coherent beams from the beams.

The microscope may include a filter disposed so that the beams are incident on the filter before the optics, the filter being configured to transmit substantially only EUV rays.

The microscope may include a shutter, a pinhole, and a filter arranged in an order of the shutter, the pinhole, and the filter, so that the beams are sequentially transmitted through the shutter, the pinhole, and the filter before being incident on the optics.

The detector may include a two-dimensional charge-coupled device (2D CCD).

The calculator may include a program configured to reconstruct the image of the object from the field spectrum. The program may reconstruct the image of the object by performing an inverse Fourier transformation of electromagnetic waves having an amplitude and a phase of the field spectrum. The phase of the field spectrum may be calculated using a hybrid input output (HIO) algorithm. The amplitude of the field spectrum may be measured from the field spectrum detected by the detector.

At least one of the above and other features and advantages may be realized by providing a method of providing image data, including directing beams onto an object including a reflective material, detecting a field spectrum formed by beams reflected by the object, and reconstructing an image of the object from the detected field spectrum.

BRIEF DESCRIPTION OF THE DRAWINGS

The above and other features and advantages will become more apparent to those of ordinary skill in the art by describing in detail exemplary embodiments thereof with reference to the attached drawings, in which.

DETAILED DESCRIPTION OF THE INVENTION

Figure 1:
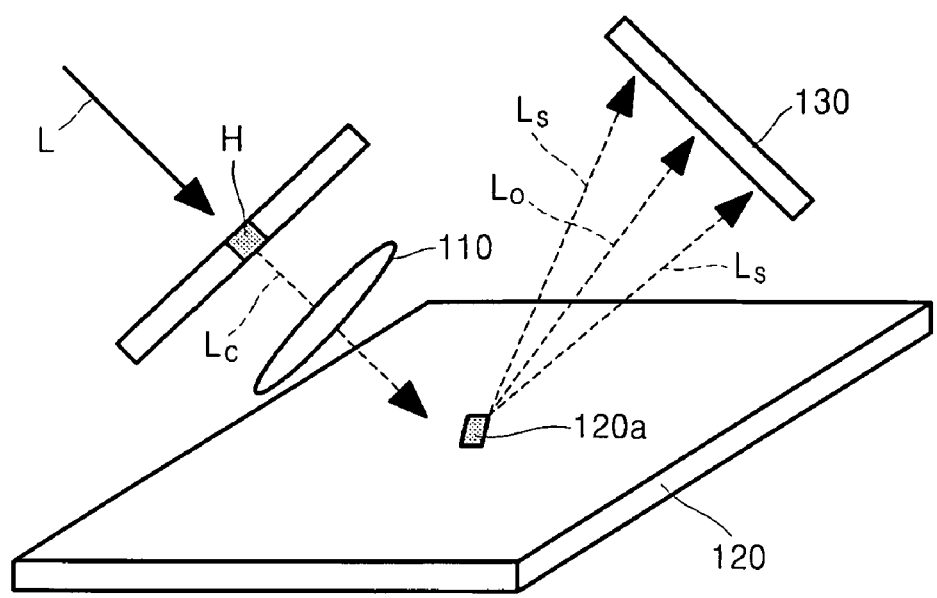
FIG. 1 illustrates a schematic diagram of part of a structure in a microscope according to an embodiment of the present invention.

Korean Patent Application No. 10-2007-0050260, filed on May 23, 2007, in the Korean Intellectual Property Office, and entitled: "Microscope and Method of Providing Image Data Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawings, thicknesses of layers and regions may be exaggerated for clarity of illustration. In the entire specification, like reference numerals denote like elements. In the specification, when it is described that an element such as a film, a region, or a substrate is located "on" the other element, it can be interpreted that the element directly contacts the other element or there are other elements disposed between the above two elements. Also, relative terms such as "lower" or "bottom", and "upper" or "top" can be used in order to describe relations of some elements with respect to the other elements as shown in the drawings. The relative terms can include other directions in addition to the direction shown in the drawings. For example, if the device in the figures is turned over, elements described as being on the "lower" side of other elements would then be oriented on "upper" sides of the other elements. Therefore, the term "lower" can includes both directions of "lower" and "upper" according to the direction in the drawings. Similarly, if the device is turned over in one of the drawings, elements described to be located "below or beneath" other elements will become located above the other elements in that drawing. Therefore, the term "below or beneath" can in a sense include both directions of "above" and "below".

FIG. 1 illustrates a schematic diagram of a part of a structure in a microscope according to an embodiment of the present invention.

Referring to FIG. 1, a microscope may include a pinhole H, condenser optics 110, and a detector 130. The condenser optics 110 may direct incident beams ($L_c$) onto an object 120 including a reflective material. The beams ($L_c$) may be EUV light, e.g., having a wavelength of about 13.5 nm. The object 120 including the reflective material may be a reflective mask, e.g., an EUV mask. The pin hole H may be provided before the condenser optics 110 and may select coherent light ($L_c$) from the beams (L). That is, incoherent light may be excluded from the beams (L) after passing through the pin hole H, so only coherent light ($L_c$) is directed onto the object 120. The detector 130 may detect a field spectrum formed by the beams reflected by a pattern 120a of the object 120. If the beams have a short wavelength, e.g., EUV light, a scattering angle of the field spectrum, i.e., the angle between a $0^{th}$ frame beam ($L_O$) and lower order beams ($L_S$), is small, and the field spectrum may be detected by the detector 130.

Figure 2:
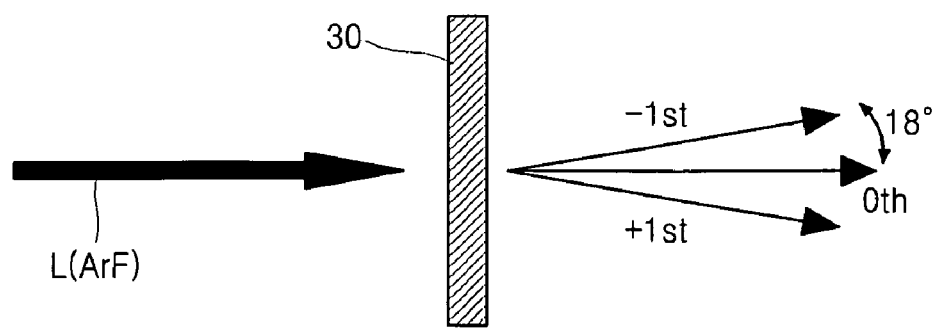
FIG. 2 illustrates a diagram of a scatter angle of an ArF ray after passing through an ArF mask.
Figure 3:
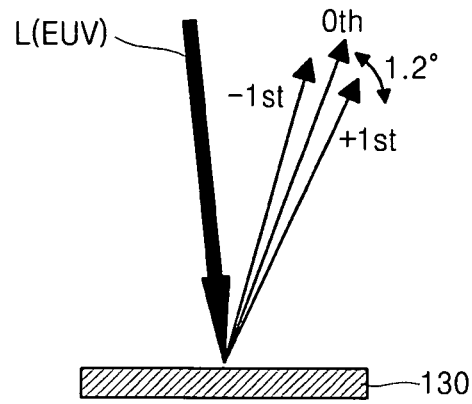
FIG. 3 illustrates a diagram of a scatter angle of an EUV ray after being reflected by an EUV mask.

FIG. 2 illustrates a scattering angle of an argon fluoride (ArF) beam after passing through an ArF mask. FIG. 3 illustrates a scattering angle of an EUV beam after being reflected by the EUV mask.

Referring to FIGS. 2 and 3, the scattering angle of the ArF beam after passing through the ArF mask 30 is about ±18°, while the scattering angle of the EUV beam after being reflected by the EUV mask 130 is much smaller, about ±1.2°. The above results were obtained under an environment where a pattern pitch of the ArF mask is about 640 nm, a pattern pitch of the EUV mask is about 256 nm, a wavelength of the ArF beam is about 193 nm, and a wavelength of the EUV beam is about 13.5 nm. The smaller the wavelength of the beam, the smaller the scattering angle. The scattering angle of the field spectrum of the visible light or ultraviolet (UV) light may be too large to be detected by a detector having a predetermined size. However, the scattering angle of the field spectrum of the EUV light ray is sufficiently small that such a detector may be used.

Figure 4:
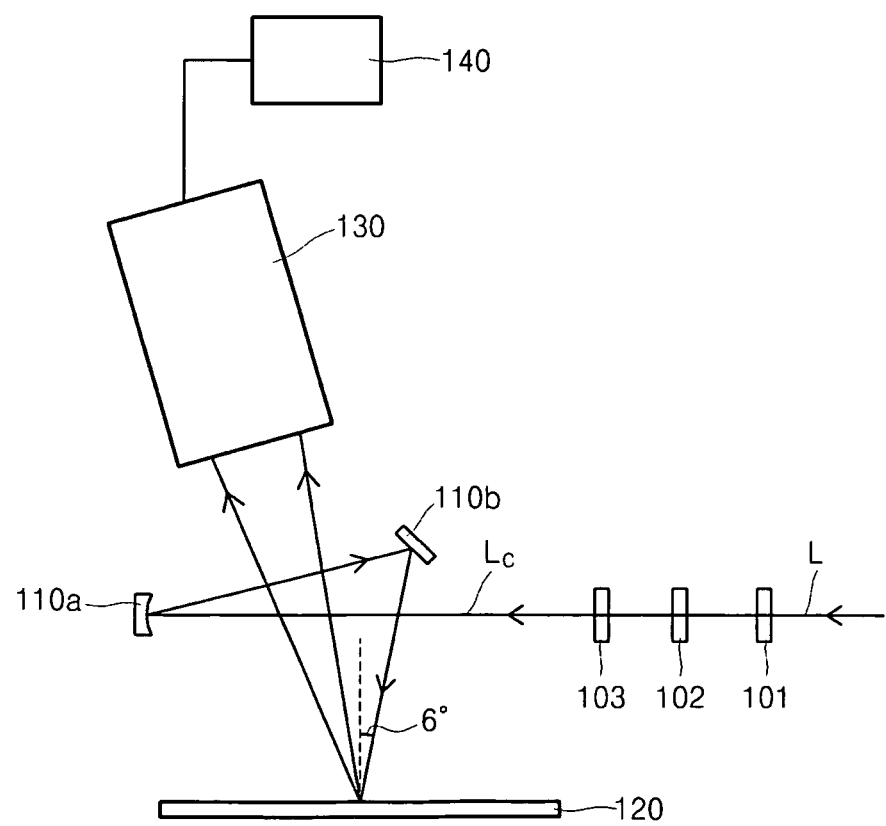
FIG. 4 illustrates a diagram of a detailed structure of a microscope according to an embodiment of the present invention.

FIG. 4 illustrates a diagram of a detailed structure of the microscope according to an embodiment.

Referring to FIG. 4, beams (L) may be sequentially transmitted through a shutter 101, a pinhole 102, and a filter 103. The shutter 101 may adjust an intensity of the beams (L). The pinhole 102 may select coherent light from the beams (L). The filter 103, e.g., a zirconium (Zr) filter, may block light other than EUV light, e.g., UV light, and transmit EUV light. The collimated, filtered light ($L_c$) may be incident on condenser optics 110. The condenser optics 110 may include a spherical mirror 110a and a plane mirror 110b. The beams ($L_c$) may be incident on the spherical mirror 110a first, and then may be incident on the plane mirror 110b. The spherical mirror 110a may focus the beams ($L_c$) to be a size of the pattern on the object 120. The plane mirror 110b may adjust the incident angle of the beams ($L_c$) onto the pattern of the object 120 to be a predetermined angle.

When the object 120 is a EUV mask, a maximum reflectivity may occur when the beams are incident at an angle of about 6° with respect to a line perpendicular to the EUV mask. Thus, the plane mirror 110b may be configured so that the beams reflected from the spherical mirror 110a are incident on the object 120 at an angle of about 6° with respect to the line perpendicular to the object 120. Here, the line perpendicular to the object 120 may be any line perpendicular to a large surface of the object 120. The spherical mirror 110a and the plane mirror 110b may have multi-layered structures, e.g., a repeated stack of a molybdenum layer and a silicon layer formed using a magnetron and radio frequency (RF) sputtering method. The field spectrum produced by the beams reflected by the object 120 may be detected by the detector 130. The detector 130 may be a two-dimensional charge-coupled device (2D CCD).

A calculator 140 may reconstruct an image of the object 120 using the field spectrum from the detector 130. That is, the calculator 140 may replace the imaging optics of the related art. Since calculation processing speed has been greatly improved, an image reconstruction time may be substantially reduced, and image reconstruction using the calculator 140 may be industrially practical. The calculator 140 may include a program reconstructing the image of the object 120 from the field spectrum. For example, the program may reconstruct the image of the object 120 by performing an inverse Fourier transformation on electromagnetic waves having an amplitude and a phase of the field spectrum. The amplitude of the field spectrum may be obtained by measuring the field spectrum transmitted from the detector 130 that has been calibrated. On the other hand, the phase of the field spectrum cannot be directly measured, but may be estimated using an iterative transform algorithm, e.g., using a hybrid input output (HIO) algorithm.

Figure 5:
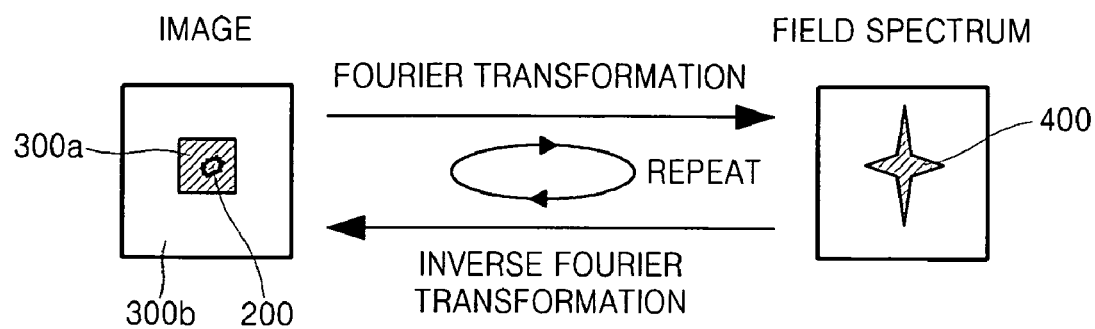
FIG. 5 illustrates is a block diagram of a relation between a field spectrum and an image.

FIG. 5 illustrates a block diagram of a relation between the field spectrum and the image.

Referring to FIG. 5, in order to reconstruct an image 200 of the object 120, the electromagnetic wave having the amplitude and the phase of the field spectrum 400 must be transformed using the inverse Fourier transformation. The amplitude of the field spectrum 400 may be obtained by measuring the field spectrum detected by the detector. The phase of the field spectrum 400 may be calculated from the field spectrum, e.g., using the HIO algorithm.

Hereinafter, the HIO algorithm will be described. First, any image may be set as the image 200. For example, the image 200 may be set so that the amplitude is axially symmetric. Next, the field spectrum 400 may be obtained by performing the Fourier transformation of the image 200, and the amplitude component of the field spectrum 400 may be replaced with the value from the experimental measurement. That is, the field spectrum 400 may be configured by combining the phase component that is calculated and the amplitude component that is measured. Then, the field spectrum 400 may be transformed using the inverse Fourier transformation process to reconstruct the image 200. The image 200 may be iteratively readjusted until a value of an oversampling area 300b converges to zero. The oversampling area 300b is a Fourier transformation area corresponding to a cell size of the detector. An image area 300a is smaller than the oversampling area 300b, and the area to which the beams may be incident may coincide with the image area 300a. The above process is repeated until the oversampling area 300b converges to zero, and then, the image 200 is finally reconstructed.

In the microscope and the method of providing image data using the microscope according to the present invention, the image data of the reflective mask can be provided without optical errors that may arise from using imaging optics.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A microscope, comprising:
   optics configured to direct beams onto an object including a reflective material;
   a detector configured to receive a field spectrum formed by beams reflected by the object; and
   a calculator configured to reconstruct an image of the object from the field spectrum detected by the detector, wherein:
   the calculator includes a program configured to reconstruct the image of the object from the field spectrum,
   the program reconstructs the image of the object by performing an inverse Fourier transformation of electromagnetic waves having an amplitude and a phase of the field spectrum, and
   the phase of the field spectrum is calculated using a hybrid input output (HIO) algorithm.

2. The microscope as claimed in claim 1, wherein the beams are extreme ultra violet (EUV) beams.

3. The microscope as claimed in claim 2, wherein the EUV beams have a wavelength of about 13.5 nm.

4. The microscope as claimed in claim 1, wherein the object is a reflective mask.

5. The microscope as claimed in claim 4, wherein the reflective mask is an EUV mask.

6. The microscope as claimed in claim 1, wherein the optics include a spherical mirror and a plane mirror.

7. The microscope as claimed in claim 6, wherein the optics are configured so that the beams are sequentially reflected by the spherical mirror and then the plane mirror.

8. The microscope as claimed in claim 6, wherein the plane mirror is formed so that the beams reflected by the spherical mirror are incident on the object at an angle of about 6° from a line perpendicular to the object.

9. The microscope as claimed in claim 6, wherein the spherical mirror and the plane mirror each include a multi-layered structure.

10. The microscope as claimed in claim 9, wherein the multi-layered structure includes a repeating stack of a molybdenum layer and a silicon layer.

11. The microscope as claimed in claim 1, further comprising:
    a shutter disposed so that the beams are incident on the shutter before the optics, the shutter being configured to adjust an intensity of the beams.

12. The microscope as claimed in claim 1, further comprising:
    a pinhole disposed so that the beams are incident on the pinhole before the optics, the pinhole being configured to select coherent beams from the beams.

13. The microscope as claimed in claim 1, further comprising:
    a filter disposed so that the beams are incident on the filter before the optics, the filter being configured to substantially transmit only EUV rays.

14. The microscope as claimed in claim 1, further comprising a shutter, a pinhole, and a filter arranged in an order of the shutter, the pinhole, and the filter, so that the beams are sequentially transmitted through the shutter, the pinhole, and the filter before being incident on the optics.

15. The microscope as claimed in claim 1, wherein the detector includes a two-dimensional charge-coupled device (2D CCD).

16. The microscope as claimed in claim 1, wherein the amplitude of the field spectrum is measured from the field spectrum detected by the detector.

17. The microscope as claimed in claim 1, wherein the filter is a zirconium filter.

18. A method of providing image data, comprising:
    directing beams sequentially through onto an object including a reflective material;
    detecting a field spectrum formed by beams reflected by the object; and
    reconstructing an image of the object from the detected field spectrum, wherein reconstructing includes performing an inverse Fourier transformation of electromagnetic waves having an amplitude and a phase of the field spectrum and calculating the phase of the field spectrum using a hybrid input output (HIO) algorithm.

* * * * *